United States Patent
Yang et al.

(10) Patent No.: US 11,159,986 B2
(45) Date of Patent: Oct. 26, 2021

(54) UNLICENSED SPECTRUM ACCESS METHOD AND DEVICE, AND TRANSMISSION NODE

(71) Applicant: ZTE CORPORATION, Shenzhen (CN)

(72) Inventors: Weiwei Yang, Shenzhen (CN); Bo Dai, Shenzhen (GD)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/324,248

(22) PCT Filed: Aug. 7, 2017

(86) PCT No.: PCT/CN2017/096227
§ 371 (c)(1),
(2) Date: Mar. 21, 2019

(87) PCT Pub. No.: WO2018/028545
PCT Pub. Date: Feb. 15, 2018

(65) Prior Publication Data
US 2019/0373509 A1    Dec. 5, 2019

(30) Foreign Application Priority Data
Aug. 9, 2016  (CN) .......................... 201610645975.9

(51) Int. Cl.
*H04W 28/18*    (2009.01)
*H04L 5/00*    (2006.01)
(Continued)

(52) U.S. Cl.
CPC ............. *H04W 28/18* (2013.01); *H04L 5/001* (2013.01); *H04W 72/0406* (2013.01); *H04W 4/70* (2018.02); *H04W 72/044* (2013.01)

(58) Field of Classification Search
CPC ... H04L 27/0006; H04L 5/001; H04L 5/0053; H04W 28/18; H04W 4/70; H04W 72/0406; H04W 72/044; H04W 74/006
See application file for complete search history.

(56) References Cited

U.S. PATENT DOCUMENTS

2014/0362780 A1\* 12/2014 Malladi ............... H04L 27/0006
  370/329
2015/0049709 A1\* 2/2015 Damnjanovic ....... H04L 5/0055
  370/329

(Continued)

FOREIGN PATENT DOCUMENTS

CN    105517181 A    4/2016
CN    105578573 A    5/2016
(Continued)

OTHER PUBLICATIONS

English Translation of International Search Report for International Application No. PCT/CN2017/096227 dated Oct. 27, 2017, 2 pages.

*Primary Examiner* — Kashif Siddiqui
(74) *Attorney, Agent, or Firm* — Li & Cai Intellectual Property (USA) Office

(57) ABSTRACT

Provided in the present disclosure are an unlicensed spectrum access method and device, and a transmission node. The access method includes: determining, by a transmission node, an access manner of an unlicensed spectrum and an access parameter corresponding to the access manner according to a preset condition, the preset condition comprising at least one of followings: a transmission parameter for information transmitted over the unlicensed spectrum, a type of the information, a grade corresponding to the transmission node, and an access signaling; and accessing, by the transmission node, the unlicensed spectrum according to the determined access manner and access parameter.

16 Claims, 2 Drawing Sheets

(51) Int. Cl.
*H04W 72/04* (2009.01)
*H04W 4/70* (2018.01)

(56) References Cited

U.S. PATENT DOCUMENTS

2016/0309498 A1* 10/2016 Luo ................... H04W 72/1268
2017/0332440 A1* 11/2017 Xu ....................... H04L 67/104
2018/0020452 A1* 1/2018 Yerramalli ........ H04W 56/0015
2018/0115991 A1* 4/2018 Yang ................ H04W 74/0808

FOREIGN PATENT DOCUMENTS

CN          105722222 A   6/2016
WO          2016110197 A1  7/2016

* cited by examiner

UNLICENSED SPECTRUM ACCESS METHOD AND DEVICE, AND TRANSMISSION NODE

CROSS-REFERENCE TO RELATED APPLICATION

This application is the 371 application of PCT Application No. PCT/CN2017/096227, filed Aug. 7, 2017, which is based upon and claims priority to Chinese Patent Application No. 201610645975.9, filed Aug. 9, 2016, the entire contents of which are incorporated herein by reference.

TECHNICAL FIELD

The present disclosure relates to the field of communications, and more particularly, to an unlicensed spectrum access method and device, and a transmission node.

BACKGROUND

Machine Type Communication (MTC) User Equipment (UE), also known as Machine to Machine (M2M) user communication equipment, is the main application form of the Internet of Things. Several technologies suitable for Comb-Internet of Things (C-IOT) are disclosed in the 3rd Generation Partnership Project (3GPP) technical report TR45.820V200, among which the Narrow Band-Internet Of Things (NB-IoT) technology is the most remarkable.

It is well known that Long Term Evolution (LTE) is deployed in a licensed carrier to operate. However, with the rapid growth of data services, in the near future, the licensed spectrum will no longer be able to bear such a huge data volume. Therefore, deploying LTE in the unlicensed spectrum and sharing data traffic in the licensed carrier through the unlicensed spectrum is an important evolution direction for subsequent development of LTE.

For the use of the unlicensed spectrum, different countries have different regulations. For example, in the European market, the unlicensed spectrum shall be used through listen-before-talk (LBT). For specific LBT mechanism, processes corresponding to Frame Based Equipment (FBE) and Load Based Equipment (LBE) are different.

For FBE, the process of LBT is as follows: before transmission, Clear Channel Assessment (CCA) needs to be performed on the equipment, and if the assessment result is that the channel is idle, then data will be sent immediately; otherwise, the data cannot be transmitted until the next fixed frame period. The fixed frame is composed of Channel Occupancy Time (COT) and idle period, wherein the COT is between 1 ms and 10 ms, the minimum idle period is 5% of the COT, and at the end of the idle period, new CCA detection is performed on the equipment.

For LBE, the process of LBE includes an initial CCA process and an extended CCA process. There are two LBE processes. For manner A, the initial CCA process is as follows: before transmission, CCA needs to be performed on the equipment to judge whether the channel is idle according to the channel assessment result; if the channel assessment result indicates that the channel is idle, the data is sent immediately; otherwise, the equipment cannot send the data, and the extended CCA is performed to extend the CCA to q observation time slots. The observation time slot may either be an unoccupied idle time slot or a busy time slot. The busy time slot refers to all the time between two unoccupied idle time slots. An initial value of q is 16. When N unoccupied idle time slots are not detected in prior extended CCA, the value of q is doubled. Once the value of q reaches 1024, the value of q of next extended CCA is reset as 16. N is randomly selected in [1, q]. For manner B, the initial CCA process is as follows: before transmission, CCA needs to be performed on the equipment to judge whether the channel is idle according to the channel assessment result; if the channel assessment result indicates that the channel is idle, the data is sent immediately; otherwise, the equipment cannot send the data, and the extended CCA is performed to generate a random number N, wherein the value of N is a counter, and the value range is [1, q]. Then, CCA assessment is performed to judge whether the channel is occupied; if the channel is occupied, the value of N is unchanged, and CCA detection is continued; if the channel is unoccupied, the value of N is reduced by 1, and whether the value of N is reduced to 0 is judged; if the value of N is reduced to 0, then the data is sent; otherwise, CCA detection is continued. That is, the CCA detection is performed on the equipment for N times. If the channel is detected to be idle, the value of N decreases progressively; otherwise, the value of N is unchanged, and the data is sent when the value of N decreases progressively to 0. As stipulated in the COT regulations, the maximum COT is 13 ms. It is also stipulated in the existing regulations that a detection duration corresponding to the CCA detection, i.e., the CCA duration, is no less than 20 us.

It is supported to deploy an LTE system, i.e., a wideband system, in the unlicensed spectrum in the communication field at current, but there is no specific scheme that supports to deploy a narrow band system in the unlicensed spectrum.

No effective solutions have been proposed regarding the problem that a narrow-band system is not supported to access an unlicensed spectrum in the related art.

This section provides background information related to the present disclosure which is not necessarily prior art.

SUMMARY

The present disclosure provides an unlicensed spectrum access method, device and transmission node to at least solve the problem that the narrow-band system is not supported to access an unlicensed spectrum in the related art.

According to an aspect of the present disclosure, there is provided an unlicensed spectrum access method, including:

determining, by a transmission node, an access manner of an unlicensed spectrum and access parameter corresponding to the access manner according to a preset condition, the preset condition including at least one of followings: a transmission parameter for information transmitted over the unlicensed spectrum, a type of the information, a grade corresponding to the transmission node, and access signaling; and accessing, by the transmission node, the unlicensed spectrum according to the determined access manner and access parameter.

Optionally, the access manner includes at least one of followings:

a first access manner: not performing Clear Channel Assessment CCA before the information transmission; and a second access manner: performing CCA before the information transmission, and determining whether to transmit the information according to a CCA result.

Optionally, the transmission parameter for the information transmitted over the unlicensed spectrum includes at least one of followings:

a number of corresponding subcarriers during the information transmission; and a number of corresponding resource units (RU) during the information transmission.

Optionally, when the preset condition includes the transmission parameter for the information transmitted over the unlicensed spectrum, the determining, by the transmission node, the access manner of the unlicensed spectrum according to the preconfigured condition includes at least one of followings:

when the number of corresponding subcarriers during the information transmission is less than or equal to a preset value M, determining, by the transmission node, that the access manner is the first access manner; and when the number of corresponding subcarriers during the information transmission is greater than the preset value M, determining, by the transmission node, that the access manner is the second access manner, wherein M is a positive integer; and when the number of corresponding resource units during the information transmission is less than or equal to X, determining, by the transmission node, that the access manner is the first access manner; and when the number of corresponding resource units during the information transmission is greater than X, determining, by the transmission node, that the access manner is the second access manner, wherein X is a positive integer.

Optionally, the type of the information includes at least one of followings:

a service type corresponding to the information; a transmission block length corresponding to the information; and a type corresponding to a physical channel carrying the information.

Optionally, when the preconfigured condition includes the type of the information, the determining, by the transmission node, the access manner of the unlicensed spectrum according to the preconfigured condition includes at least one of followings:

when the service type corresponding to the information is control information, determining, by the transmission node, that the access manner is the first access manner; and when the service type corresponding to the information is data information, determining, by the transmission node, that the access manner is the second access manner;

when the transmission block length corresponding to the information is less than or equal to Y, determining, by the transmission node, that the access manner is the first access manner; and when transmission block length corresponding to the information is greater than Y, determining, by the transmission node, that the access manner is the second access manner, wherein Y is a positive integer; and when the physical channel carrying the information is a control channel, determining, by the transmission node, that the access manner is the first access manner; and when the physical channel carrying the information is a data channel, determining, by the transmission node, that the access manner is the second access manner.

Optionally, the grade corresponding to the transmission node includes at least one of followings:

a corresponding repeating grade during the information transmission, a coverage grade corresponding to the transmission node, and a coverage mode corresponding to the transmission node.

Optionally, when the preset condition includes the grade corresponding to the transmission node, the determining, by the transmission node, the access manner of the unlicensed spectrum according to the preconfigured condition includes at least one of followings:

when the corresponding repeating grade during the information transmission is less than or equal to a preset value N, determining, by the transmission node, that the access manner is the first access manner; and when the corresponding repeating grade during the information transmission is greater than the preset value N, determining, by the transmission node, that the access manner is the second access manner, wherein N is a positive integer.

when the coverage grade of the transmission node is a medium or low coverage grade, determining, by the transmission node, that the access manner is the first access manner; and when the coverage grade of the transmission node is a high coverage grade, determining, by the transmission node, that the access manner is the second access manner; and when the coverage mode of the transmission node is a medium or low coverage mode, determining, by the transmission node, that the access manner is the first access manner; and when the coverage mode of the transmission node is a big coverage mode, determining, by the transmission node, that the access manner is the second access manner.

Optionally, when the preset condition includes the access signaling, the determining, by the transmission node, the access manner of the unlicensed spectrum according to the preset condition includes:

determining, by the transmission node, the access manner according to an indication of the access signaling, wherein the access signaling includes at least one of the followings: a semi-static signaling and a dynamic signaling.

Optionally, the access parameter corresponding to the access manner includes at least one of followings:

a CCA assessment position, a CCA assessment length, and a maximum channel occupation duration.

Optionally, the CCA assessment position includes at least one of followings:

a preset position, wherein the preset position includes the last m Orthogonal Frequency Division Multiplexing (OFDM) symbols or the first n OFDM symbols of each radio frame, each subframe, each time slot, each resource unit, x subframes, y time slots and z resource units, wherein x, y, z, m and n are positive integers respectively; and a signaling indicated position, wherein the signaling indicated position includes at least one of followings:

p OFDM symbols where the signaling indicated CCA is located, wherein p is a positive integer; and a period and an offset corresponding to the signaling indicated CCA.

Optionally, the maximum channel occupation duration includes a maximum duration that the transmission node can be transmitted after accessing the unlicensed spectrum, wherein a unit of the duration includes at least one of followings: a subframe, a time domain length corresponding to a resource unit, and a time slot.

Optionally, the determining, by the transmission node, the access parameter corresponding to the access manner includes at least one of followings:

when the transmission node determines that the access manner is the first access manner, determining that the maximum channel occupation duration is the same as a duration required for the information transmission; and when the transmission node determines that the access manner is the second access manner, the determining the maximum channel occupation duration including at least one of the followings: determining through preset value setting, and determining through a duration indicated by the access signaling.

Optionally, when the transmission node determines that the access manner is the second access manner, the corresponding CCA assessment length includes at least one of followings:

CCA assessment lengths corresponding to B accesses required for information transmission being the same; and the CCA assessment lengths corresponding to the B accesses required for information transmission being decreased with an increase of access times;

wherein B is a positive integer, and a value of B depends on a duration of the information transmission and the maximum channel occupation duration.

Optionally, when the transmission node determines that the access manner is the second access manner, the determining, by the transmission node, the access parameter corresponding to the access manner according to the preset condition includes at least one of followings:

the number of corresponding subcarriers during the information transmission being inversely proportional to a CCA assessment position interval;

the number of corresponding subcarriers during the information transmission being inversely proportional to the CCA assessment length;

the number of corresponding subcarriers during the information transmission being inversely proportional to the maximum channel occupation duration;

the number of corresponding resource units during the information transmission being directly proportional to the CCA assessment position interval;

the number of corresponding resource units during the information transmission being directly proportional to the CCA assessment length; and the number of corresponding resource units during the information transmission being directly proportional to the maximum channel occupation duration.

Optionally, when the transmission node determines that the access manner is the second access manner, the determining, by the transmission node, the access parameter corresponding to the access manner according to the preset condition includes at least one of followings:

the transmission block length corresponding to the information being directly proportional to a CCA assessment position interval;

the transmission block length corresponding to the information being directly proportional to the CCA assessment length; and the transmission block length corresponding to the information being directly proportional to the maximum channel occupation duration.

Optionally, when the transmission node determines that the access manner is the second access manner, the determining, by the transmission node, the access parameter corresponding to the access manner according to the preset condition includes at least one of followings:

the corresponding repeating grade during the information transmission being directly proportional to a CCA assessment position interval;

the corresponding repeating grade during the information transmission being directly proportional to the CCA assessment length; and the corresponding repeating grade during the information transmission being directly proportional to the maximum channel occupation duration.

Optionally, when the transmission node determines that the access manner is the second access manner, the determining, by the transmission node, the access parameter corresponding to the access manner according to the preset condition includes:

determining, by the transmission node, the corresponding access parameter according to an indication of the access signaling.

According to another aspect of the present disclosure, there is also provided an unlicensed spectrum access device applied to a transmission node, including:

a determination module configured to at least determine an access manner of an unlicensed spectrum and an access parameter corresponding to the access manner according to a preset condition, the preset condition including at least one of followings: a transmission parameter for information transmitted over the unlicensed spectrum, a type of the information, a grade corresponding to the transmission node, and an access signaling; and an accessing module configured to access the unlicensed spectrum according to the determined access manner and access parameter.

Optionally, the determination module includes an access manner determination unit, the access manner determination unit is configured to determine the access manner of the unlicensed spectrum according to the preset condition, and the access manner includes at least one of followings:

a first access manner: not performing Clear Channel Assessment CCA before the information transmission; and a second access manner: performing CCA before the information transmission, and determining whether to transmit the information according to a CCA result.

Optionally, when the preset condition includes the transmission parameter for the information transmitted over the unlicensed spectrum, the access manner determination unit is further configured to:

when a number of corresponding subcarriers during the information transmission is less than or equal to a preset value M, determine that the access manner is the first access manner; and when the number of corresponding subcarriers during the information transmission is greater than the preset value M, determine that the access manner is the second access manner, wherein M is a positive integer; and when the number of corresponding resource units during the information transmission is less than or equal to X, determine that the access manner is the first access manner, and when the number of corresponding resource units during the information transmission is greater than X, determine that the access manner is the second access manner, wherein X is a positive integer.

Optionally, when the preset condition includes the type of the information, the access manner determination unit is further configured to:

when the service type corresponding to the information is control information, determine that the access manner is the first access manner, and when the service type corresponding to the information is data information, determine that the access manner is the second access manner;

when the transmission block length corresponding to the information is less than or equal to Y, determine that the access manner is the first access manner, and when the transmission block length corresponding to the information is greater than Y, determine that the access manner is the second access manner, wherein Y is a positive integer; and when the physical channel carrying the information is a control channel, determine that the access manner is the first access manner, and when the physical channel carrying the information is a data channel, determine that the access manner is the second access manner.

Optionally, when the preset condition includes the grade corresponding to the transmission node, the access manner determination unit is further configured to:

when the corresponding repeating grade during the information transmission is less than or equal to a preset value N, determine that the access manner is the first access manner, and when the corresponding repeating grade during the information transmission is greater than the preset value N, determine that the access manner is the second access manner, wherein N is a positive integer;

when the coverage grade of the transmission node is a medium or low coverage grade, determine that the access manner is the first access manner, and when the coverage grade of the transmission node is a high coverage grade, determine that the access manner is the second access manner; and when the coverage mode of the transmission node is a medium or low coverage mode, determine that the access manner is the first access manner, and when the coverage mode of the transmission node is a big coverage mode, determine that the access manner is the second access manner.

Optionally, when the preset condition includes the access signaling, the access manner determination unit is further configured to:

determine the access manner according to an indication of the access signaling, wherein the access signaling includes at least one of followings: a semi-static signaling and a dynamic signaling.

Optionally, the determination module further includes an access parameter determination unit, and the access parameter determination unit is configured to determine the access parameter corresponding to the access manner after the access manner is determined, wherein the access parameter includes at least one of followings:

a CCA assessment position, a CCA assessment length, and a maximum channel occupation duration.

Optionally, the CCA assessment position includes at least one of followings:

a preset position, wherein the preset position includes the last m Orthogonal Frequency Division Multiplexing (OFDM) symbols or the first n OFDM symbols of each radio frame, each subframe, each time slot, each resource unit, x subframes, y time slots and z resource units, wherein x, y, z, m and n are positive integers respectively; and a signaling indicated position, wherein the signaling indicated position includes at least one of followings:

p OFDM symbols where the signaling indicated CCA is located, wherein p is a positive integer; and a period and an offset corresponding to the signaling indicated CCA.

Optionally, the maximum channel occupation duration includes a maximum duration that the transmission node can be transmitted after accessing the unlicensed spectrum, wherein a unit of the duration includes at least one of followings: a subframe, a time domain length corresponding to a resource unit, and a time slot.

Optionally, the determination module further includes a duration determination unit, and the duration determination unit is configured to:

when the access manner is the first access manner, determine that the maximum channel occupation duration is the same as a duration required for the information transmission; and when the access manner is the second access manner, determine the maximum channel occupation duration through at least one of followings: determining through preset value setting, and through a duration indicated by the access signaling.

Optionally, the access parameter determination unit is further configured to determine the access parameter corresponding to the access manner according to the preset condition when the transmission node determines that the access manner is the second access manner, and the determining the access parameter includes at least one of followings:

the number of corresponding subcarriers during the information transmission being inversely proportional to a CCA assessment position interval;

the number of corresponding subcarriers during the information transmission being inversely proportional to the CCA assessment length;

the number of corresponding subcarriers during the information transmission being inversely proportional to the maximum channel occupation duration;

the number of corresponding resource units during the information transmission being directly proportional to the CCA assessment position interval;

the number of corresponding resource units during the information transmission being directly proportional to the CCA assessment length; and the number of corresponding resource units during the information transmission being directly proportional to the maximum channel occupation duration.

Optionally, the access parameter determination unit is further configured to determine the access parameter corresponding to the access manner according to the preset condition when the transmission node determines that the access manner is the second access manner, and the determining the access parameters includes at least one of followings:

the transmission block length corresponding to the information being directly proportional to a CCA assessment position interval;

the transmission block length corresponding to the information being directly proportional to the CCA assessment length; and the transmission block length corresponding to the information being directly proportional to the maximum channel occupation duration.

Optionally, the access parameter determination unit is further configured to determine the access parameter corresponding to the access manner according to the preset condition when the transmission node determines that the access manner is the second access manner, and the determining the access parameters includes at least one of followings:

the corresponding repeating grade during the information transmission being directly proportional to a CCA assessment position interval;

the corresponding repeating grade during the information transmission being directly proportional to the CCA assessment length; and the corresponding repeating grade during the information transmission being directly proportional to the maximum channel occupation duration.

Optionally, the access parameter determination unit is further configured to determine the access parameter corresponding to the access manner according to the preset condition when the transmission node determines that the access manner is the second access manner, and the determining the access parameters includes:

determining the corresponding access parameters according to an indication of the access signaling.

According to another aspect of the present disclosure, there is also provided a transmission node including the above unlicensed spectrum access device.

According to one embodiment of the present disclosure, there is also provided a storage medium including a stored program, wherein the program executes any of the above unlicensed spectrum access methods during running.

Through the embodiments of the present disclosure, the access manner of the unlicensed spectrum and the access parameter corresponding to the unlicensed spectrum are determined by the transmission node according to the preset conditions such as the transmission parameter for information transmitted over the unlicensed spectrum, the type of the information, the access signaling, and the coverage conditions corresponding to the transmission node, so as to access the unlicensed spectrum, thereby solving the problem that the narrow-band system cannot be supported to access the unlicensed spectrum in the related art, and providing an effective method for enabling the narrow-band system to access the unlicensed spectrum.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings illustrated here serve to provide a further understanding of the present disclosure and constitute a part of the application, and the illustrative embodiments of the present disclosure and together with the description thereof serve to explain the present disclosure, but do not constitute inappropriate definition to the present disclosure. In the drawings.

DETAILED DESCRIPTION

The present disclosure will be explained in detail with reference to the accompanying drawings and embodiments hereinafter. It should be noted that, in case of no conflict, the embodiments in the present application and the features in the embodiments may be combined with each other.

It should be noted that the terms "first", "second" and the like in the description and claims of the present disclosure as well as the above drawings are used to distinguish similar objects, and are not necessarily used to describe a specific sequence or a chronological order. It should be understood that the data used in this manner may be interchanged where appropriate so that the embodiments of the present disclosure described herein can be implemented in an order other than those illustrated or described herein. In addition, the terms "include" and "have" and any deformation thereof are intended to cover a non-exclusive inclusion, for example, a process, method, system, product, or device that includes a series of steps or units is not necessarily limited to those steps or units that are explicitly listed, but may include other steps or units that are not explicitly listed or inherent to such process, method, product or device.

First Embodiment

According to an embodiment of the present disclosure, an unlicensed spectrum access method is provided. It should be noted that the steps shown in the flow chart of the drawings may be executed in a computer system such as a set of computer-executable instructions, and, although a logical sequence is shown in the flow chart, in some cases, the steps shown or described may be executed in a sequence different from that herein.

Figure 1:
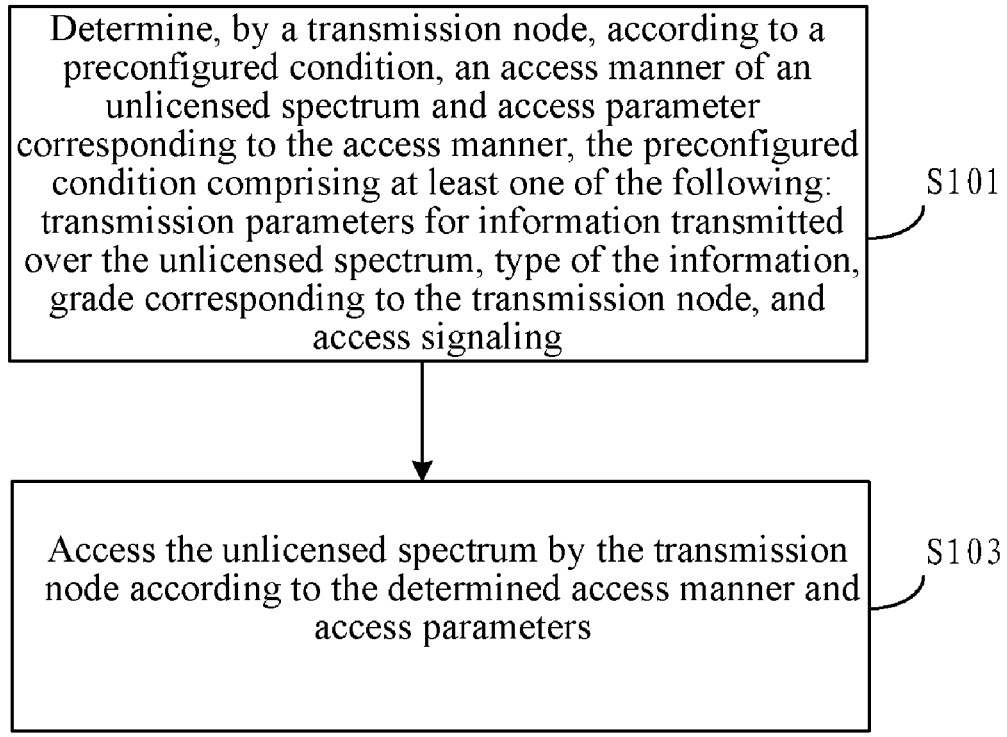
FIG. 1 is a flow chart of an unlicensed spectrum access method according to a first embodiment of the present disclosure.

FIG. 1 is a flow chart of an unlicensed spectrum access method according to a first embodiment of the present disclosure. As shown in FIG. 1, the method includes the following steps.

In S101, a transmission node determines an access manner of an unlicensed spectrum and an access parameter corresponding to the access manner according to a preset condition. The preset condition includes at least one of the followings: a transmission parameter for information transmitted over the unlicensed spectrum, a type of the information, a coverage condition corresponding to the transmission node, and an access signaling.

In S103, the transmission node accesses the unlicensed spectrum according to the access manner and the access parameter determined.

Through the embodiment, the access manner of the unlicensed spectrum and the access parameter corresponding to the unlicensed spectrum are determined by the transmission node according to the preset conditions such as the transmission parameter for information transmitted over the unlicensed spectrum, the type of the information, the access signaling, the coverage condition corresponding to the transmission node and the like, so as to access the unlicensed spectrum, thereby solving the problem that the narrow-band system cannot be supported to access the unlicensed spectrum in the related art, and providing an effective method for enabling the narrow-band system to access the unlicensed spectrum.

It should be noted that the transmission node mentioned here may be understood as a terminal or a device involved in other wireless communication systems that can access an unlicensed spectrum, and this is not limited in the embodiment.

The access manner mentioned in the embodiment includes at least one of the followings:

a first access manner: not performing Clear Channel Assessment CCA before the information transmission; and a second access manner: performing CCA before the information transmission, and determining whether to transmit the information according to a CCA result.

How to select the corresponding access manner according to the above preset conditions is specifically explained in the preferred solution of the embodiment. The specific technical solution is as follows.

First, the transmission parameter of the unlicensed spectrum includes, but is not limited to, at least one of the followings: a number of corresponding subcarriers when the information is transmitted over the unlicensed spectrum; and a number of corresponding resource units when the information is transmitted over the unlicensed spectrum.

When the preset condition includes the transmission parameter for information transmitted over the unlicensed spectrum, the determining, by the transmission node, the access manner of the unlicensed spectrum according to the preset condition includes at least one of the followings:

when the number of corresponding subcarriers during the information transmission is less than or equal to a preset value M, determining, by the transmission node, that the access manner is the first access manner; and when the number of corresponding subcarriers during the information transmission is greater than the preset value M, determining, by the transmission node, that the access manner is the second access manner, wherein M is a positive integer; and when the number of corresponding resource units during the information transmission is less than or equal to X, determining, by the transmission node, that the access manner is the first access manner; and when the number of corresponding resource units during the information transmission is greater than X, determining, by the transmission node, that the access manner is the second access manner, wherein X is a positive integer.

Second, the type of the information includes, but is not limited to, at least one of the followings: a service type corresponding to the information; a transmission block length corresponding to the information; and a physical channel carrying the information.

When the preset condition includes the type of the information, the determining, by the transmission node, the access manner of the unlicensed spectrum according to the preset condition includes at least one of the followings:

when the service type corresponding to the information is control information, determining, by the transmission node, that the access manner is the first access manner; and when the service type corresponding to the information is data information, determining, by the transmission node, that the access manner is the second access manner;

when the transmission block length corresponding to the information is less than or equal to Y, determining, by the transmission node, that the access manner is the first access manner; and when transmission block length corresponding to the information is greater than Y, determining, by the transmission node, that the access manner is the second access manner, wherein Y is a positive integer; and when the physical channel carrying the information is a control channel, determining, by the transmission node, that the access manner is the first access manner; and when the physical channel carrying the information is a data channel, determining, by the transmission node, that the access manner is the second access manner.

Third, the grade corresponding to the transmission node includes at least one of the followings:

a corresponding repeating grade during the information transmission; a coverage grade corresponding to the transmission node; and a coverage mode corresponding to the transmission node.

When the preset condition includes the grade corresponding to the transmission node, the determining, by the transmission node, the access manner of the unlicensed spectrum according to the preset condition includes at least one of the followings:

when the corresponding repeating grade during the information transmission is less than or equal to a preset value N, determining, by the transmission node, that the access manner is the first access manner; and when the corresponding repeating grade during the information transmission is greater than the preset value N, determining, by the transmission node, that the access manner is the second access manner, wherein N is a positive integer.

when the coverage grade of the transmission node is medium or low, determining, by the transmission node, that the access manner is the first access manner; and when the coverage grade of the transmission node is high, determining, by the transmission node, that the access manner is the second access manner; and when the coverage mode of the transmission node is medium or low, determining, by the transmission node, that the access manner is the first access manner; and when the coverage mode of the transmission node is big, determining, by the transmission node, that the access manner is the second access manner.

Fourth, when the preset condition includes the access signaling, the determining, by the transmission node, the access manner of the unlicensed spectrum according to the preset condition includes at least one of the followings:

determining, by the transmission node, the access manner according to an indication of the access signaling, wherein the access signaling includes at least one of the followings: a semi-static signaling and a dynamic signaling.

No matter it is the semi-static signaling or the dynamic signaling, after the transmission node receives the signaling, the signaling will include an indication of which access manner is to be selected, and the transmission node only needs to follow the indication of the signaling to select the access manner.

In the preferred solution above, an example is given to illustrate how the transmission node determines the access manner of the unlicensed spectrum, but other solutions that can determine the access manner are not excluded, and this is not limited in the embodiment.

In the embodiments of the present disclosure, the access parameter corresponding to the transmission node includes, but is not limited to, at least one of the followings: a CCA assessment position, a CCA assessment length, and a maximum channel occupation duration.

The CCA assessment position includes at least one of the followings:

a preset position, wherein the preset position includes the last m Orthogonal Frequency Division Multiplexing OFDM symbols or the first n OFDM symbols of each radio frame, each subframe, each time slot, each resource unit, x subframes, y time slots and z resource units, wherein x, y, z, m and n are positive integers respectively; and a signaling indicated position, wherein the signaling indicated position includes p OFDM symbols where the CCA is located; or a period and/or offset corresponding to the CCA, wherein p is a positive integer.

In a preferred solution of the embodiment, the maximum channel occupation duration includes, but is not limited to, a maximum duration that can be transmitted after the transmission node accesses the unlicensed spectrum, wherein a fundamental unit of the maximum channel occupation duration is a resource unit.

When the transmission node determines that the access manner is the second access manner according to the preset condition above, i.e., determines to perform CCA, the CCA length includes at least one of the followings: CCA assessment lengths corresponding to B accesses required for information transmission being the same; and CCA assessment lengths corresponding to B accesses required for information transmission being different, wherein B is a positive integer. Preferably, the CCA length decreases with the increase of the access times.

In the embodiment, the maximum channel occupation duration includes a maximum duration that can be transmitted after the transmission node accesses the unlicensed spectrum, wherein a unit of the duration includes at least one of the followings: a subframe, a time domain length corresponding to a resource unit, and a time slot. In a preferred solution of the embodiment, a manner for the transmission node to determine the maximum channel occupation duration includes, but is not limited to, at least one of the followings:

when the transmission node determines that the access manner is the first access manner, the maximum channel occupation duration being the same as a duration required for the information transmission; and when the transmission node determines that the access manner is the second access manner, the maximum channel occupation duration being a preset value, or being indicated by an access signaling.

Further, in a preferred example of the embodiment, when the transmission node determines that the access manner is the second access manner, the determining, by the transmission node, the access parameter corresponding to the access manner includes, but is not limited to, at least one of the followings:

the number of corresponding subcarriers during the information transmission being inversely proportional to a CCA assessment position interval, i.e., the more the subcarriers are, the smaller the CCA assessment position interval is;

the number of corresponding subcarriers during the information transmission being inversely proportional to the CCA assessment length, i.e., the more the subcarriers are, the shorter the CCA length is;

the number of corresponding subcarriers during the information transmission being inversely proportional to the CCA assessment length, i.e., the more the subcarriers are, the shorter the maximum channel occupation duration is;

the number of corresponding resource units during the information transmission being directly proportional to the CCA assessment position interval, i.e., the more the resource units are, the larger the CCA assessment position interval is;

the number of corresponding resource units during the information transmission being directly proportional to the CCA assessment length, i.e., the more the resource units are, the longer the CCA assessment length is; and the number of corresponding resource units during the information transmission being directly proportional to the maximum channel occupation duration, i.e., the more the resource units are, the longer the maximum channel occupation duration is.

In another preferred example of the embodiment, when the transmission node determines that the access manner is the second access manner, the determining, by the transmission node, the access parameter corresponding to the access manner according to the preset condition further includes at least one of the followings:

the transmission block length corresponding to the information being directly proportional to a CCA assessment position interval, i.e., the larger the transmission block length is, the larger the CCA assessment position interval is;

the transmission block length corresponding to the information being directly proportional to the CCA assessment length, i.e., the larger the transmission block length corresponding to the information is, the longer the CCA assessment length is; and the transmission block length corresponding to the information being directly proportional to the maximum channel occupation duration, i.e., the larger the transmission block length corresponding to the information is, the longer the maximum channel occupation duration is.

In another preferred example of the embodiment, when the transmission node determines that the access manner is the second access manner, the determining, by the transmission node, the access parameter corresponding to the access manner according to the preset condition further includes at least one of the followings:

the corresponding repeating grade during the information transmission being directly proportional to a CCA assessment position interval, i.e., the larger the corresponding repeating grade during the information transmission is, the larger the CCA assessment position interval is;

the corresponding repeating grade during the information transmission being directly proportional to the CCA assessment length, i.e., the larger the corresponding repeating grade during the information transmission is, the longer the CCA assessment length is; and the corresponding repeating grade during the information transmission being directly proportional to the maximum channel occupation duration, i.e., the larger the corresponding repeating grade during the information transmission is, the longer the maximum channel occupation duration is.

In another preferred example of the embodiment, when the transmission node determines that the access manner is the second access manner, the determining, by the transmission node, the access parameter corresponding to the access manner according to the preset condition further includes:

determining, by the transmission node, the corresponding access parameters according to an indication of the access signaling, wherein the access signaling includes a semi-static signaling and a dynamic signaling.

Through the description of the above embodiments, those skilled in the art can clearly understand that the method according to the above embodiments can be implemented by means of software plus a necessary general hardware platform, and, the method can also be implemented by means of hardware, but in many cases, the former is a better implementation manner. Based on such understanding, the essence of the technical solutions of the present disclosure, or the part contributing to the prior art, may be embodied in the form of a software product, and the computer software product is stored in a storage medium (such as a ROM/RAM, a magnetic disk and an optical disk) including a number of instructions such that a terminal device (which may be a mobile phone, a computer, a server, or a network device, etc.) performs the methods described in each of the embodiments of the present disclosure.

Second Embodiment

In order to better understand the method in the foregoing embodiment, the embodiment further provides an unlicensed spectrum access device applied to the above-mentioned transmission node. The device is used to realize the above-mentioned embodiments and the preferred embodiments, which have already been described and will not be elaborated. As used below, the term "module" can implement a combination of software and/or hardware with a predetermined function. Although the apparatus described in the following embodiment is preferably implemented by means of software, the implementation of hardware or a combination of software and hardware is also possible and conceived.

Figure 2:
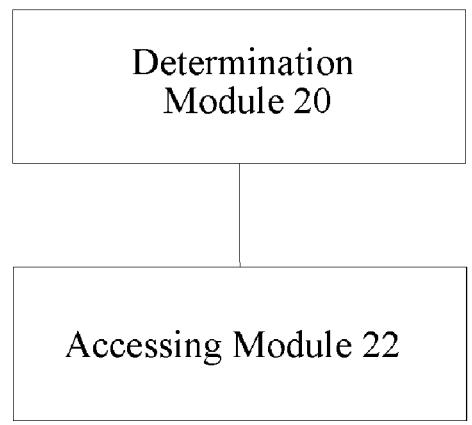
FIG. 2 is a first structure diagram of an unlicensed spectrum access device according to a second embodiment of the present disclosure.

FIG. 2 is a first structure diagram of an unlicensed spectrum access device according to a second embodiment of the present disclosure. As shown in FIG. 2, the device includes:

a determination module 20 configured to at least determine an access manner of an unlicensed spectrum and an access parameter corresponding to the access manner according to a preset condition, the preset condition including at least one of the followings: a transmission parameter for information transmitted over the unlicensed spectrum, a type of the information, coverage conditions corresponding to the transmission node, and an access signaling; and an accessing module 22 connected to the determination module 20 and configured to access the unlicensed spectrum according to the access manner and the access parameters determined.

Through the embodiment, the access manner of the unlicensed spectrum and the access parameter corresponding to the unlicensed spectrum are determined by the determination module according to the preset conditions such as the transmission parameter for information transmitted over the unlicensed spectrum, the type of the information, the access signaling, the coverage condition corresponding to the transmission node and the like, so as to access the above-mentioned unlicensed spectrum through the accessing module, thereby solving the problem that the narrow-band system cannot be supported to access the unlicensed spectrum in the related art, and providing an effective device for enabling the narrow-band system to access the unlicensed spectrum.

Figure 3:
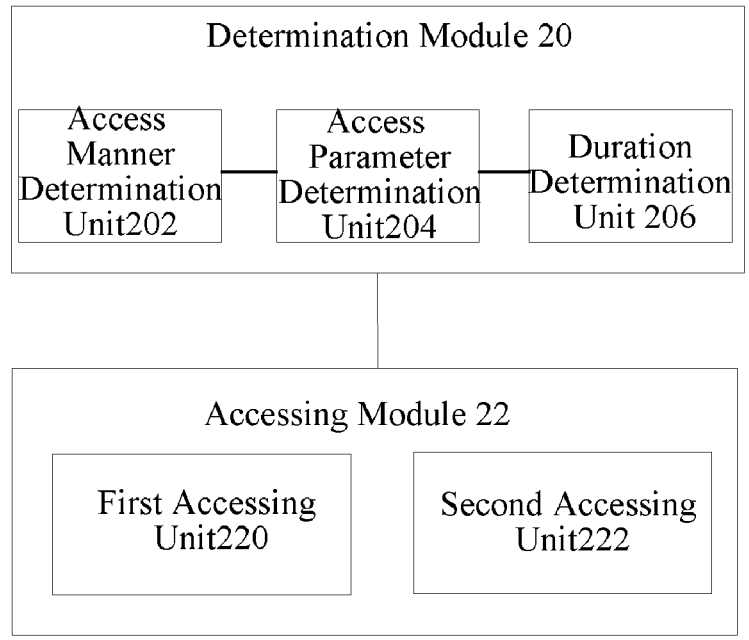
FIG. 3 is a second structure diagram of the unlicensed spectrum access device according to the second embodiment of the present disclosure.

FIG. 3 is a second structure diagram of the unlicensed spectrum access device according to the second embodiment of the present disclosure. As shown in FIG. 3, in a preferred solution of the embodiment, the determination module 20 includes an access manner determination unit 202, the access manner determination unit 202 is configured to determine the access manner of the unlicensed spectrum according to the preset condition, and the access manner includes at least one of the followings:

a first access manner: not performing Clear Channel Assessment CCA before the information transmission; and a second access manner: performing CCA, wherein whether the information is transmitted is determined according to a CCA result.

The accessing module 22 at least includes:

a first accessing unit 220 configured to access the unlicensed spectrum according to the first access manner; and a second accessing unit 222 configured to access the unlicensed spectrum according to the second access manner.

In the preferred implementation manner of the embodiment, the access manner determination unit 202 is further configured to:

1) determine the access manner according to a comparison result between a number of subcarriers and a preset value:

when the number of corresponding subcarriers during the information transmission is less than or equal to a preset value M, determining that the access manner is the first access manner; and when the number of corresponding subcarriers during the information transmission is greater than the preset value M, determining that the access manner is the second access manner, wherein M is a positive integer; and when the number of corresponding resource units during the information transmission is less than or equal to X, determining that the access manner is the first access manner; and when the number of corresponding resource units during the information transmission is greater than X, determining that the access manner is the second access manner, wherein X is a positive integer;

2) determine the access manner according to a service type corresponding to the information:

when the service type corresponding to the information is control information, determining that the access manner is the first access manner, and when the service type corresponding to the information is data information, determining that the access manner is the second access manner;

3) determine the access manner according to a comparison result between a transmission block length corresponding to the information and a preset value Y:

when the transmission block length corresponding to the information is less than or equal to Y, determining that the access manner is the first access manner, and when the transmission block length corresponding to the information is greater than Y, determining that the access manner is the second access manner, wherein Y is a positive integer;

4) determine the access manner according to a type of a physical channel carrying the information:

when the physical channel carrying the information is a control channel, determining that the access manner is the first access manner; and when the physical channel carrying the information is a data channel, determining that the access manner is the second access manner;

5) determine the access manner according to a corresponding repeating grade during the information transmission:

when the corresponding repeating grade during the information transmission is less than or equal to a preset value N, determining that the access manner is the first access manner; and when the corresponding repeating grade during the information transmission is greater than the preset value N, determining that the access manner is the second access manner, wherein N is a positive integer;

when the coverage grade of the transmission node is medium or low, determining that the access manner is the first access manner, and when the coverage grade of the transmission node is high, determining that the access manner is the second access manner; and when the coverage mode of the transmission node is medium or low, determining that the access manner is the first access manner, and when the coverage mode of the transmission node is big, determining that the access manner is the second access manner; and 6) determine the access manner according to an indication of the access signaling, wherein the access signaling includes at least one of the followings: a semi-static signaling and a dynamic signaling.

In another preferred implementation manner of the embodiment, the determination module 20 further includes an access parameter determination unit 204, the access parameter determination unit 204 is configured to, after determining the access manner, determine the access parameter according to the access manner, and the access parameter include at least one of the followings:

a CCA assessment position, a CCA assessment length, and a maximum channel occupation duration.

The CCA assessment position includes at least one of the followings:

a preset position, wherein the preset position includes the last m Orthogonal Frequency Division Multiplexing OFDM symbols or the first n OFDM symbols of each radio frame, each subframe, each time slot, each resource unit, x subframes, y time slots and z resource units, wherein x, y, z, m and n are positive integers respectively; and a signaling indicated position, wherein the signaling indicated position includes at least one of the followings:

p OFDM symbols where the signaling indicated CCA is located, wherein p is a positive integer; and a period and an offset corresponding to the signaling indicated CCA, wherein the period and the offset are usually configured at the same time.

In a preferred implementation manner, the maximum channel occupation duration includes a maximum duration that can be transmitted after the transmission node accesses the unlicensed spectrum, wherein a unit of the duration includes at least one of the followings: a subframe, a time domain length corresponding to a resource unit, and a time slot.

In another implementation manner of the embodiment, the determination module 20 further includes a duration determination unit 206, and the duration determination unit 206 is configured to:

when the access manner is the first access manner, determine that the maximum channel occupation duration is the same as a duration required for the information transmission; and when the access manner is the second access manner, determine the maximum channel occupation duration through at least one of the followings: determining through preset value setting, and through a duration indicated by the access signaling.

The access parameter determination unit 204 is further configured to determine the access parameter corresponding to the access manner according to the preset condition when the transmission node determines that the access manner is the second access manner, and the determining the access parameter includes at least one of the followings:

1) determining the access parameter according to a number of corresponding subcarriers during the information transmission:

the number of corresponding subcarriers during the information transmission being inversely proportional to a CCA assessment position interval, i.e., the more the subcarriers are, the smaller the CCA assessment position interval is;

the number of corresponding subcarriers during the information transmission being inversely proportional to the CCA assessment length, i.e., the more the subcarriers are, the shorter the CCA length is; and the number of corresponding subcarriers during the information transmission being inversely proportional to the CCA assessment length, i.e., the more the subcarriers are, the shorter the maximum channel occupation duration is;

2) determining the access parameter according to a number of corresponding resource units during the information transmission:

the number of corresponding resource units during the information transmission being directly proportional to the CCA assessment position interval, i.e., the more the resource units are, the larger the CCA assessment position interval is;

the number of corresponding resource units during the information transmission being directly proportional to the CCA assessment length, i.e., the more the resource units are, the longer the CCA assessment length; and the number of corresponding resource units during the information transmission being directly proportional to the maximum channel occupation duration, i.e., the more the resource units are, the longer the maximum channel occupation duration is;

3) determining the access parameter according to a transmission block length corresponding to the information:

the transmission block length corresponding to the information being directly proportional to a CCA assessment position interval, i.e., the larger the transmission block length is, the larger the CCA assessment position interval is;

the transmission block length corresponding to the information being directly proportional to the CCA assessment length, i.e., the larger the transmission block length corresponding to the information is, the longer the CCA assessment length is; and the transmission block length corresponding to the information being directly proportional to the maximum channel occupation duration, i.e., the larger the transmission block length corresponding to the information is, the longer the maximum channel occupation duration is;

4) determining the access parameter according to a corresponding repeating grade during the information transmission:

the corresponding repeating grade during the information transmission being directly proportional to a CCA assessment position interval, i.e., the larger the corresponding repeating grade during the information transmission is, the larger the CCA assessment position interval is;

the corresponding repeating grade during the information transmission being directly proportional to the CCA assessment length, i.e., the larger the corresponding repeating grade during the information transmission is, the longer the CCA assessment length is; and the corresponding repeating grade during the information transmission being directly proportional to the maximum channel occupation duration, i.e., the larger the corresponding repeating grade during the information transmission is, the longer the maximum channel occupation duration is; and 5) determining the access parameter according to an indication of the access signaling, wherein the access signaling includes a semi-static signaling and a dynamic signaling.

It should be noted that there is a connection relation between the determination module 20 and the accessing module 22, thus implementing the completeness of the entire flow.

It should be noted that in the above embodiments of the present disclosure, the determination module 20, the accessing module 22, and each function unit in the determination module 20 and the accessing module 22 should be configured into an entity that at least includes a transmission node. The above modules may be implemented by software or hardware, and the latter may be implemented by the following means, but is not limited thereto: the above modules are all located in the same processor (the processor is located in the above transmission node); or, the above modules are respectively located in different processors in any combination form.

Third Embodiment

To better understand the foregoing embodiments of the present disclosure, the present disclosure will be further described in this embodiment through preferred embodiments.

Figure 4:
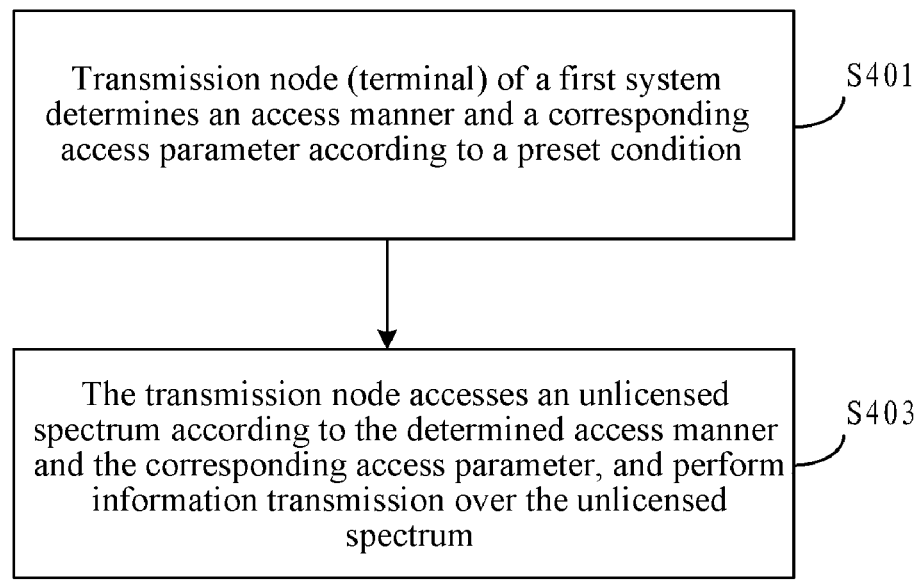
FIG. 4 is a flow chart of an unlicensed spectrum access method according to a third embodiment of the present disclosure.

FIG. 4 is a flow chart of an unlicensed spectrum access method according to a third embodiment of the present disclosure. As shown in FIG. 4, the method mainly includes the following steps.

In S401, a transmission node (terminal) of a first system determines an access manner and a corresponding access parameter according to a preset condition.

In S403, the transmission node accesses the unlicensed spectrum according to the access manner and the corresponding access parameter determined, and performs information transmission over the unlicensed spectrum.

It is assumed that a Frequency Division Duplex (FDD) downlink is located in a licensed spectrum and an FDD uplink is located in an unlicensed spectrum, UE receives Downlink Control Information (DCI) corresponding to uplink data transmission on a subframe a and starts uplink access over a subframe a+k−1, wherein a is a positive integer and k is an integer greater than or equal to a preset value.

It is assumed that a CCA assessment position is the last OFDM symbol of each subframe.

First Preferred Embodiment

It is assumed that a number of corresponding subcarriers during uplink data transmission is indicated as 1, and an uplink data transmission duration is indicated as K ms in the DCI, a terminal determines the access manner according to the number of subcarriers, i.e., the access manner is the first access manner, then CCA is not performed before the data transmission, and the terminal starts uplink data transmission directly over a subframe a+k; wherein, a channel occupation duration is K ms, i.e., the same as the data transmission duration.

Second Preferred Embodiment

It is assumed that the number of corresponding subcarriers during uplink data transmission is indicated as 3, and the uplink data transmission duration is indicated as K ms in the DCI, the terminal determines that the access manner is the second access manner according to the number of subcarriers, i.e., CCA is performed first, and then the data transmission is determined according to a CCA result; the terminal performs CCA on the last OFDM symbol of the subframe a+k−1, and only when the CCA result is that the channel is idle, the terminal starts uplink data transmission over the subframe a+k; wherein, a CCA length is $T_1$, and the data transmission length after access is $L_1$ ms because the maximum channel occupation duration is $L_1$ ms.

Third Preferred Embodiment

It is assumed that the number of corresponding subcarriers during uplink data transmission is indicated as 6, and a number of corresponding Resource Units (RUs) during uplink data transmission is indicated as 10 in the DCI, when the number of subcarriers is 6, one resource unit corresponds to 2 ms in time domain, then the uplink data transmission duration is 20 ms, and the terminal determines that the access manner is the second access manner according to the number of subcarriers, i.e., CCA is performed first, and then data transmission is determined according to the CCA result; the terminal performs CCA on the last OFDM symbol of the subframe a+k−1, and only when the CCA result is that the channel is idle, the terminal starts uplink data transmission over the subframe a+k; and the data transmission length after access is $L_2$ ms because the maximum channel occupation duration is $L_2$ ms, wherein the CCA length is $T_2$.

Fourth Preferred Embodiment

It is assumed that the number of corresponding subcarriers during uplink data transmission is indicated as 12, and the uplink data transmission duration is indicated as K ms in the DCI, the terminal determines that the access manner is the second access manner according to the number of subcarriers, i.e., CCA is performed first, and then data transmission is determined according to the CCA result; the terminal performs CCA on the last OFDM symbol of the subframe a+k−1, and only when the CCA result is that the channel is idle, the terminal starts uplink data transmission over the subframe a+k; and the data transmission length after access is $L_3$ ms because the maximum channel occupation duration is $L_3$ ms, wherein the CCA length is $T_3$.

In the second, third and fourth preferred embodiments: when the CCA result is that the channel is busy, the terminal performs CCA again at next CCA position, such as the last OFDM symbol of the subframe a+k, and determines data transmission according to the CCA result.

When one transmission is finished, the terminal performs CCA at the nearest CCA position, and determines next access transmission according to the CCA result until the K ms data transmission is finished.

Fifth Preferred Embodiment

In the second, third and fourth preferred embodiments, it is assumed that the CCA length of the access parameter needs to be determined according to the number of subcarriers; when the number of subcarriers is more, the CCA length is shorter, i.e., $T_1 > T_2 > T_3$.

Sixth Preferred Embodiment

In the second, third and fourth preferred embodiments, it is assumed that the maximum channel occupation duration of the access parameter needs to be determined according to the number of subcarriers; when the number of subcarriers is more, the CCA length is shorter, i.e., $L_1 > L_2 > L_3$.

Seventh Preferred Embodiment

It is assumed that data transmission requires ceil (K/L) times of accesses, the CCA length is the same at each access, which is $T_4$ ms, wherein ceil is an upward rounding operation, K is the uplink data transmission duration, and L is the maximum channel occupation duration.

Eighth Preferred Embodiment

It is assumed that data transmission requires b=ceil (K/L) times of accesses, the CCA length is different at each access, wherein the CCA length at the first access is $T_{51}$, the CCA length at the second access is $T_{52}$, ..., the CCA length at the b access is $T_{5b}$, and $T_{51} > T_{52} > ... > T_{55}$.

Ninth Preferred Embodiment

When the access manner is the second access manner, the access parameter is determined according to the number of subcarriers, wherein the larger the number of subcarriers is, the smaller the CCA position interval is.

Fourth Embodiment

It is assumed that an FDD downlink is located in a licensed spectrum and an FDD uplink is located in an unlicensed spectrum, UE receives DCI corresponding to uplink data transmission on a subframe a and starts uplink access over a subframe a+k, wherein a is a positive integer and k is an integer greater than or equal to a preset value. It is assumed that a CCA assessment position is the first two OFDM symbols of each subframe, and it is assumed that an uplink data transmission duration is indicated as K ms in the DCI.

First Preferred Embodiment

It is assumed that a signaling indicates that an access manner is a first access manner, then a terminal starts uplink data transmission over the subframe a+k; wherein, a channel occupation duration is K ms, i.e., the data transmission duration is the same.

Second Preferred Embodiment

It is assumed that the signaling indicates that the access manner is a second access manner, then the terminal performs CCA on the first two OFDM symbols of the subframe a+k. The terminal performs uplink data transmission only when a CCA result is that a channel is idle. When the CCA result is that the channel is busy, the terminal performs CCA on next CCA position, i.e., the first two OFDM symbols of a subframe a+k+1, and determines data transmission according to the CCA result. When one transmission is finished, the terminal performs CCA at the nearest CCA position, and determines next access transmission according to the CCA result until the K ms data transmission is finished.

An access signaling in the first and second preferred embodiments is a high layer signaling, or an access signaling newly introduced in the DCI.

Third Preferred Embodiment

When the access manner is the second manner, the access signaling also includes an indication on access parameters, i.e., one or more of the CCA duration, the CCA position and the channel occupation duration are indicated through the access signaling.

Fifth Embodiment

It is assumed that an FDD downlink is located in a licensed spectrum and an FDD uplink is located in an unlicensed spectrum, UE receives DCI corresponding to uplink data transmission on a subframe a and starts uplink access over a subframe a+k, wherein k is a positive integer greater than or equal to a preset value. It is assumed that a CCA assessment position is the first two OFDM symbols of each subframe, and it is assumed that an uplink data transmission duration is indicated as K ms in the DCI. It is assumed that a value of a repeating grade configured is N1.

First Preferred Embodiment

It is assumed that N1 is less than or equal to a preset value N, an access manner is a first access manner at this time, then a terminal starts uplink data transmission over a subframe n+k; wherein, a channel occupation duration is K ms, and a data transmission duration is the same.

Second Preferred Embodiment

It is assumed that the access manner is a second access manner when N1 is greater than a preset value N, then the terminal performs CCA on the first two OFDM symbols of the subframe a+k. The terminal performs uplink data transmission only when a CCA result is that a channel is idle. When the CCA result is that the channel is busy, the terminal performs CCA on next CCA position, i.e., the first two OFDM symbols of a subframe a+k+1, and determines data transmission according to the CCA result. When one transmission is finished, the terminal performs CCA at the nearest CCA position, and determines next access transmission according to the CCA result until the K ms data transmission is finished.

Third Preferred Embodiment

When the access manner is the second access manner, the access parameter is determined according to the value of N1, i.e., the larger the value of N1, the longer the channel occupation time, or the larger the value of N1, the larger the CCA length; or, the larger the value of N1, the larger the CCA position interval.

Fourth Preferred Embodiment

It is assumed that a configured coverage mode is a manner A, i.e., medium-low coverage, and the access manner is the first assess manner at this time, then the terminal starts uplink data transmission over the subframe n+k; wherein, the channel occupation duration is K ms, and the data transmission duration is the same.

Fifth Preferred Embodiment

It is assumed that a configured coverage level is medium-low coverage, and the access manner is the first assess manner at this time, then the terminal starts uplink data transmission over the subframe n+k; wherein, the channel occupation duration is K ms, and the data transmission duration is the same.

Sixth Embodiment

It is assumed that an FDD downlink is located in a licensed spectrum and an FDD uplink is located in an unlicensed spectrum, a UE receives DCI corresponding to uplink data transmission on a subframe a and starts uplink access over a subframe a+k, wherein k is an integer greater than or equal to a preset value. It is assumed that a CCA assessment position is the last OFDM symbol of each radio frame, it is assumed that an uplink data transmission duration is indicated as K ms in DCI, and it is assumed that a number of resource units configured is X1.

First Preferred Embodiment

It is assumed that an access manner is a first access manner when X1 is less than or equal to X, then a terminal starts uplink data transmission over the subframe a+k; wherein, a channel occupation duration is K ms, and a data transmission duration is the same.

Second Preferred Embodiment

It is assumed that the access manner is a second access manner when X1 is greater than X, then the terminal performs CCA on the last OFDM symbol of a radio frame g where the subframe a+k is located, and the terminal performs uplink data transmission only when a CCA result is that a channel is idle. When the CCA result is that the channel is busy, the terminal performs CCA again at next CCA position, i.e., a first OFDM symbol in a radio frame g+1, and determines data transmission according to the CCA result. When one transmission is finished, the terminal performs CCA at the nearest CCA position, and determines next access transmission according to the CCA result until the K ms data transmission is finished.

Third Preferred Embodiment

When the access manner is the second access manner, the access parameter is determined according to the value of X1, i.e., the larger the value of X1, the longer the channel occupation time, or the larger the value of X1, the larger the CCA length; or, the larger the value of X1, the larger the CCA position interval.

Seventh Embodiment

It is assumed that a FFD downlink is located in a licensed spectrum and an FDD uplink is located in an unlicensed spectrum, UE receives downlink control information corresponding to uplink data transmission on a subframe a and starts uplink access over a subframe a+k, wherein k is a positive integer greater than or equal to a preset value. It is assumed that a CCA assessment position is the first OFDM symbol of each subframe, it is assumed that an uplink data transmission duration is indicated as K ms in DCI, and it is assumed that a transmission block length configured is Y1.

First Preferred Embodiment

It is assumed that an access manner is a first access manner when Y1 is less than or equal to Y, then a terminal starts uplink data transmission over the subframe a+k; wherein, a channel occupation duration is K ms, and a data transmission duration is the same.

Second Preferred Embodiment

It is assumed that the access manner is a second access manner when Y1 is greater than Y, then the terminal performs CCA on the first OFDM symbol of the subframe a+k, and the terminal performs uplink data transmission only when a CCA result is that a channel is idle. When the CCA result is that the channel is busy, the terminal performs CCA again at next CCA position, i.e., a first OFDM symbol in of a subframe a+k+1, and determines data transmission according to the CCA result. When one transmission is finished, the terminal performs CCA at the nearest CCA position, and determines next access transmission according to the CCA result until the K ms data transmission is finished.

Third Preferred Embodiment

When the access manner is the second access manner, the access parameter is determined according to the value of Y1, i.e., the larger the value of Y1, the longer the channel occupation time, or the larger the value of Y1, the larger the CCA length; or, the larger the value of Y1, the larger the CCA position interval.

Eighth Embodiment

An embodiment of the present disclosure also provides a storage medium. Optionally, in the embodiment, the above-mentioned storage medium can be configured to store a program code executable by the unlicensed spectrum access method provided by the foregoing embodiments.

Optionally, in the embodiment, the above-mentioned storage medium can be located in any computer terminal of a computer terminal group in a computer network or in any mobile terminal in a mobile terminal group.

Optionally, in the embodiment, the storage medium is configured to store program codes for executing the following steps:

S1: determining, by a transmission node, an access manner of an unlicensed spectrum and an access parameter corresponding to the access manner according to a preset condition, the preset condition including at least one of the followings: a transmission parameter for information transmitted over the unlicensed spectrum, a type of the information, a grade corresponding to the transmission node, and an access signaling; and S2: accessing, by the transmission node, the unlicensed spectrum according to the access manner and the access parameter determined.

The above serial numbers of the embodiments of the present disclosure are for description only and do not represent good or bad of the embodiments.

In the above-mentioned embodiments of the present disclosure, the description of each embodiment has its own emphasis. For parts not detailed in one embodiment, please refer to the related description of other embodiments.

In the several embodiments provided in the present application, it should be understood that the disclosed technical contents may be implemented in other ways. The device embodiments described above are merely illustrative. For example, the division of the units is only a kind of logical function division. In practice, there may be another division manner. For example, multiple units or components may be combined or integrated into another system, or some features may be ignored or not performed. In addition, the illustrated or discussed mutual coupling or direct coupling or communication connection may be indirect coupling or communication connection through some interfaces, units or modules, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objectives of the solutions in the embodiments.

In addition, each function unit in each embodiment of the invention may be integrated in one processing unit, or each unit may exist alone physically, or two or more units may be integrated in one unit. The integrated units above may be implemented in the form of hardware, or in the form of software function units.

The integrated units may also be stored in a computer-readable storage medium if being implemented in the form of a software functional module and sold or used as an independent product. Based on such understanding, the essence of the technical solutions of the invention, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the invention. The foregoing storage medium includes: any medium that is capable of storing program codes such as a USB disk, a Read-Only Memory (ROM), a Random Access Memory (RAM), a mobile hard disk, a magnetic disk or an optical disk, and the like.

Those described above are merely preferred embodiments of the present disclosure, but are not intended to limit the present disclosure. Any change, equivalent substitution, and improvement made within the spirit and principle of the invention shall fall within the protection scope of the present disclosure.

INDUSTRIAL APPLICABILITY

Through the embodiments of the present disclosure, the access manner of the unlicensed spectrum and the access parameter corresponding to the unlicensed spectrum are determined by the transmission node according to the preset conditions such as the transmission parameter for information transmitted over the unlicensed spectrum, the type of the information, the access signaling, the coverage condition corresponding to the transmission node and the like, so as to access the unlicensed spectrum, thereby solving the problem that the narrow-band system cannot be supported to access the unlicensed spectrum in the related art, and providing an effective method for enabling the narrow-band system to access the unlicensed spectrum.

The invention claimed is:

1. An unlicensed spectrum access method applied to a narrowband system, comprising:
   determining, by a transmission node, an access manner of an unlicensed spectrum and an access parameter corresponding to the access manner according to a preset condition, the preset condition comprising at least one of followings: a transmission parameter for information transmitted over the unlicensed spectrum, a type of the information, or a grade corresponding to the transmission node and
   accessing, by the transmission node, the unlicensed spectrum according to the determined access manner and access parameter;
   wherein the transmission parameter for the information transmitted over the unlicensed spectrum comprises at least one of followings: a number of corresponding subcarriers during the information transmission; and a number of corresponding resource units during the information transmission; and/or
   the type of the information comprises at least one of followings: a service type corresponding to the information; a transmission block length corresponding to the information; and a type corresponding to a physical channel carrying the information; and/or
   the grade corresponding to the transmission node comprises at least one of followings: a corresponding repeating grade during the information transmission; a coverage grade corresponding to the transmission node; and a coverage mode corresponding to the transmission node.

2. The method according to claim 1, wherein the access manner comprises at least one of followings:
   a first access manner not performing Clear Channel Assessment (CCA) before the information transmission; and
   a second access manner performing CCA before the information transmission, and determining whether to transmit the information according to a CCA result.

3. The method according to claim 2, wherein when the preset condition comprises the transmission parameter for the information transmitted over the unlicensed spectrum, the determining, by the transmission node, the access manner of the unlicensed spectrum according to the preset condition comprises at least one of followings:
   when the number of corresponding subcarriers during the information transmission is less than or equal to a preset value M, determining, by the transmission node, that the access manner is the first access manner; and when the number of corresponding subcarriers during the information transmission is greater than the preset value M, determining, by the transmission node, that the access manner is the second access manner, wherein M is a positive integer; and
   when the number of corresponding resource units during the information transmission is less than or equal to X, determining, by the transmission node, that the access manner is the first access manner; and when the number of corresponding resource units during the information transmission is greater than X, determining, by the transmission node, that the access manner is the second access manner, wherein X is a positive integer.

4. The method according to claim 2, wherein when the preset condition comprises the type of the information, the determining, by the transmission node, the access mariner of the unlicensed spectrum according to the preset condition comprises at least one of followings:
   when the service type corresponding to the information is control information, determining, by the transmission node, that the access manner is the first access mariner; and when the service type corresponding to the information is data information, determining, by the transmission node, that the access manner is the second access manner;
   when the transmission block length corresponding to the information is less than or equal to Y, determining, by the transmission node, that the access manner is the first access manner; and when transmission block length corresponding to the information is greater than Y, determining, by the transmission node, that the access manner is the second access manner, wherein Y is a positive integer; and
   when the physical channel carrying the information is a control channel, determining, by the transmission node, that the access manner is the first access manner; and when the physical channel carrying the information is a data channel, determining, by the transmission node, that the access manner is the second access manner.

5. The method according to claim 2, wherein when the preset condition comprises the grade corresponding to the transmission node, the determining, by the transmission node, the access manner of the unlicensed spectrum according to the preset condition comprises at least one of followings:
   when the corresponding repeating grade during the information transmission is less than or equal to a preset value N, determining, by the transmission node, that the access manner is the first access manner; and when the corresponding repeating grade during the information transmission is greater than the preset value N, determining, by the transmission node, that the access manner is the second access manner, wherein N is a positive integer;
   when the coverage grade of the transmission node is a medium or low coverage grade, determining, by the transmission node, that the access manner is the first access manner; and when the coverage grade of the transmission node is a high coverage grade, determining, by the transmission node, that the access manner is the second access manner; and when the coverage mode of the transmission node is a medium or low coverage mode, determining, by the transmission node, that the access manner is the first access manner; and when the coverage mode of the transmission node is a big coverage mode, determining, by the transmission node, that the access manner is the second access manner.

6. The method according to claim 2, wherein the access parameter corresponding to the access manner comprises at least one of followings:
a CCA assessment position, a CCA assessment length, and a maximum channel occupation duration.

7. The method according to claim 6, wherein the CCA assessment position comprises at least one of followings:
a preset position, wherein the preset position comprises the last m Orthogonal Frequency Division Multiplexing (OFDM) symbols or the first n OFDM symbols of each radio frame, each subframe, each time slot, each resource unit, x subframes, y time slots and z resource units, wherein x, y, z, m and n are positive integers respectively; and
a signaling indicated position, wherein the signaling indicated position comprises at least one of followings:
p OFDM symbols where the signaling indicated CCA is located, wherein p is a positive integer; and
a period and an offset corresponding to the signaling indicated CCA.

8. The method according to claim 6, wherein the maximum channel occupation duration comprises a maximum duration that the transmission node can be transmitted after accessing the unlicensed spectrum, and a unit of the duration comprises at least one of followings: a subframe, a time domain length corresponding to a resource unit, and a time slot.

9. The method according to claim 8, wherein the determining, by the transmission node, the access parameter corresponding to the access manner comprises at least one of followings:
when the transmission node determines that the access manner is the first access manner, determining that the maximum channel occupation duration is the same as a duration required for the information transmission; and
when the transmission node determines that the access manner is the second access manner, the determining the maximum channel occupation duration comprising: determining through preset value setting.

10. The method according to claim 6, wherein when the transmission node determines that the access mariner is the second access mariner, the corresponding CCA assessment length comprises at least one of followings:
CCA assessment lengths corresponding to B accesses required for information transmission being the same; and
the CCA assessment lengths corresponding to the B accesses required for information transmission being decreased with an increase of access times;
wherein B is a positive integer, and a value of B depends on a duration of the information transmission and the maximum channel occupation duration.

11. The method according to claim 2, wherein when the transmission node determines that the access manner is the second access manner, the determining, by the transmission node, the access parameter corresponding to the access manner according to the preset condition comprises at least one of followings:

the number of corresponding subcarriers during the information transmission being inversely proportional to a CCA assessment position interval;
the number of corresponding subcarriers during the information transmission being inversely proportional to the CCA assessment length;
the number of corresponding subcarriers during the information transmission being inversely proportional to the maximum channel occupation duration;
the number of corresponding resource units during the information transmission being directly proportional to the CCA assessment position interval;
the number of corresponding resource units during the information transmission being directly proportional to the CCA assessment length; and
the number of corresponding resource units during the information transmission being directly proportional to the maximum channel occupation duration.

12. The method according to claim 2, wherein when the transmission node determines that the access manner is the second access manner, the determining, by the transmission node, the access parameter corresponding to the access manner according to the preset condition comprises at least one of followings:
the transmission block length corresponding to the information being directly proportional to a CCA assessment position interval;
the transmission block length corresponding to the information being directly proportional to the CCA assessment length; and
the transmission block length corresponding to the information being directly proportional to the maximum channel occupation duration.

13. The method according to claim 2, wherein when the transmission node determines that the access manner is the second access manner, the determining, by the transmission node, the access parameter corresponding to the access manner according to the preset condition comprises at least one of followings:
the corresponding repeating grade during the information transmission being directly proportional to a CCA assessment position interval;
the corresponding repeating grade during the information transmission being directly proportional to the CCA assessment length; and
the corresponding repeating grade during the information transmission being directly proportional to the maximum channel occupation duration.

14. An unlicensed spectrum access device applied to a transmission node, applied to a narrowband system, comprising:
a processor; and
a memory for storing instructions executable by the processor;
wherein the processor is configured to:
at least determine an access manner of an unlicensed spectrum and an access parameter corresponding to the access manner according to a preset condition, the preset condition comprising at least one of followings: a transmission parameter for information transmitted over the unlicensed spectrum, a type of the information, or a grade corresponding to the transmission node and
access the unlicensed spectrum according to the determined access mariner and access parameter;
wherein the transmission parameter for the information transmitted over the unlicensed spectrum comprises at least one of followings: a number of corresponding subcarriers during the information transmission; and a number of corresponding resource units during the information transmission; and/or the type of the information comprises at least one of followings: a service type corresponding to the information; a transmission block length corresponding to the information; and a type corresponding to a physical channel carrying the information; and/or the grade corresponding to the transmission node comprises at least one of followings: a corresponding repeating grade during the information transmission; a coverage grade corresponding to the transmission node; and a coverage mode corresponding to the transmission node.

15. A transmission node, comprising the unlicensed spectrum access device according to claim 14.

16. A non-transitory computer-readable storage medium storing instructions which, when executed by a processor, cause the processor to perform the method according to claim 1.

* * * * *